(12) United States Patent
Kim et al.

(10) Patent No.: US 7,190,349 B2
(45) Date of Patent: Mar. 13, 2007

(54) CHARACTER INPUT DEVICE AND METHOD FOR A MOBILE TERMINAL

(75) Inventors: Jin-Woong Kim, Suwon-shi (KR); Jae-Heog Jang, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 466 days.

(21) Appl. No.: 10/713,658

(22) Filed: Nov. 14, 2003

(65) Prior Publication Data
US 2004/0100445 A1    May 27, 2004

(30) Foreign Application Priority Data
Nov. 14, 2002    (KR) ...................... 10-2002-0070769

(51) Int. Cl.
*G09G 5/00*    (2006.01)
(52) U.S. Cl. ........................ 345/168; 345/156; 341/20; 455/566
(58) Field of Classification Search ................ 345/156, 345/168; 341/20–23; 455/566
See application file for complete search history.

(56) References Cited

U.S. PATENT DOCUMENTS 6,178,338 B1 *   1/2001   Yamagishi et al. ......... 455/566
6,487,424 B1    11/2002   Kraft et al.
6,919,824 B2 *   7/2005   Lee .............................. 341/20
2002/0077156 A1*   6/2002   Smethers ..................... 455/566

FOREIGN PATENT DOCUMENTS

CN    1229316 A    9/1999

* cited by examiner

*Primary Examiner*—Richard Huerpe
*Assistant Examiner*—Kimnhung Nguyen
(74) *Attorney, Agent, or Firm*—The Farrell Law Firm

(57) ABSTRACT

A character input device and method for a mobile terminal, which enables users to quickly and conveniently input mixed characters from various character types such as Korean "Hangeul" characters, upper and lower case English characters, and different fonts and symbols. The mobile terminal includes a plurality of keys, each key being assigned characters of at least two character types, and is previously set in a character input mode of one of the character types, while characters of another of the character types can be selectively input. The character input device comprises at least one temporary mode conversion key mounted on the mobile terminal and a memory for storing character codes of each of the character types assigned to each of the plurality of keys. A controller selects one of the previously set character input mode and a temporary character mode, based on an input of the temporary mode conversion key, and reads out and recognizes character codes of each character types from the memory according to the plurality of keys input and the selected character input mode.

7 Claims, 5 Drawing Sheets

CHARACTER INPUT DEVICE AND METHOD FOR A MOBILE TERMINAL

PRIORITY

This application claims priority to an application entitled "CHARACTER INPUT DEVICE AND METHOD FOR MOBILE TERMINAL", filed in the Korean Industrial Property Office on Nov. 14, 2002 and assigned Serial No. 2002-70769, the contents of which are hereby incorporated by reference.

BACKGROUND OF THE INVENTION

1. Field of the Invention

The present invention relates generally to a character input device and method for a mobile terminal, and more particularly to a character input device and method for a mobile terminal, which enables users to quickly and conveniently input mixed characters from various text types, such as Korean "Hangeul" characters, upper and lower case English characters, and different fonts or symbols.

2. Description of the Related Art

Generally, characters such as Korean and English characters can be input, received, and transmitted using a mobile terminal. A conventional mobile terminal has four main modes for inputting characters, i.e., a Korean character mode, an upper case English character mode, a lower case English character mode, and a special character mode. One key of the mobile terminal is assigned as a menu key for conversion between the input modes during the inputting of characters. In order to convert an initial input mode to another input mode, a user must push a number of keys. For example, a user must first press a menu key to enter a mode change mode, scroll through a menu list to find a different mode to covert to, and then select the different mode. After the conversion, the user can input characters in another input mode. In order to return to the initial input mode, the user must repeat the long process again.

When a mobile terminal is used to input characters, the upper and lower case English letter is generally assigned to the keys in such a manner that three or four consecutive letters are collectively assigned to one key and the three or four letters are differentiated according to the number of times the key is input. Special characters are input in such a manner that direction keys, such as up, down, left, and right, are used to select a target special character, and then an OK or confirm key is pushed to input the selected character.

In such a character input method of the prior art, because only one menu key is used to change the input mode, the user must inconveniently push the menu key several times to change the input mode. In addition, in order to input a text of mixed English and Korean letters or upper and lower case English letters, to the user must push, for example, the menu key, a number of times.

SUMMARY OF THE INVENTION

Therefore, the present invention has been designed in view of the above and other problems, and it is an object of the present invention to provide a character input device and method for a mobile terminal wherein, when inputting mixed characters from different text types, such as Korean "Hangeul" characters, upper and lower case English characters, and different fonts or symbols, the character input mode is converted by holding a temporary mode conversion key, and, after characters are input in the converted input mode while holding the temporary mode conversion key, the input mode returns to the initial character mode by releasing the temporary key, whereby the user can input characters conveniently and quickly.

It is another object of the present invention to provide a character input device and method wherein, after the character input mode is converted by pressing the temporary mode conversion key, characters are input in the converted input mode with the temporary mode conversion key released, and the input mode returns to the initial input mode by pressing the temporary mode conversion key again.

In accordance with one aspect of the present invention, the above and other objects can be accomplished by a character input device for a mobile terminal including a plurality of keys, each key being assigned characters of at least two text types, wherein the mobile terminal is previously set in a character input mode of one of the at least two text types, while characters of another of the at least two text types can be selectively input. The character input device comprises: at least one temporary mode conversion key included in the mobile terminal; a memory for storing character codes of the at least two text types assigned to each of the plurality of keys; and a controller for selecting one of the previously set character input mode and a temporary character mode, based on an input of the temporary mode conversion key, and reading out and recognizing character codes of the at least two text types from the memory according to the plurality of keys input and the selected character input mode.

As described above, the memory stores character codes of the at least two the text types assigned to each of the plurality of keys, and the controller selects one of the previously set character input mode and a temporary character mode, based on an input of the temporary mode conversion key, and reads out and recognizes character codes of the at least two text types from the memory according to the plurality of keys input and the selected character input mode.

Preferably, the controller recognizes input characters as converted characters in the temporary character mode while the temporary mode conversion key is pushed, and recognizes the input characters as characters in a character input mode set before the conversion when the temporary mode conversion key is released. Alternatively, the controller recognizes input characters as converted characters in the temporary character mode when the temporary mode conversion key is pushed, and recognizes the input characters as characters in a character input mode set before the conversion when the temporary mode conversion key is pushed again.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail with reference to the annexed drawings. In the following description, well-known functions and components will not be described in detail as they may make the subject matter of the present invention unclear.

Figure 1:
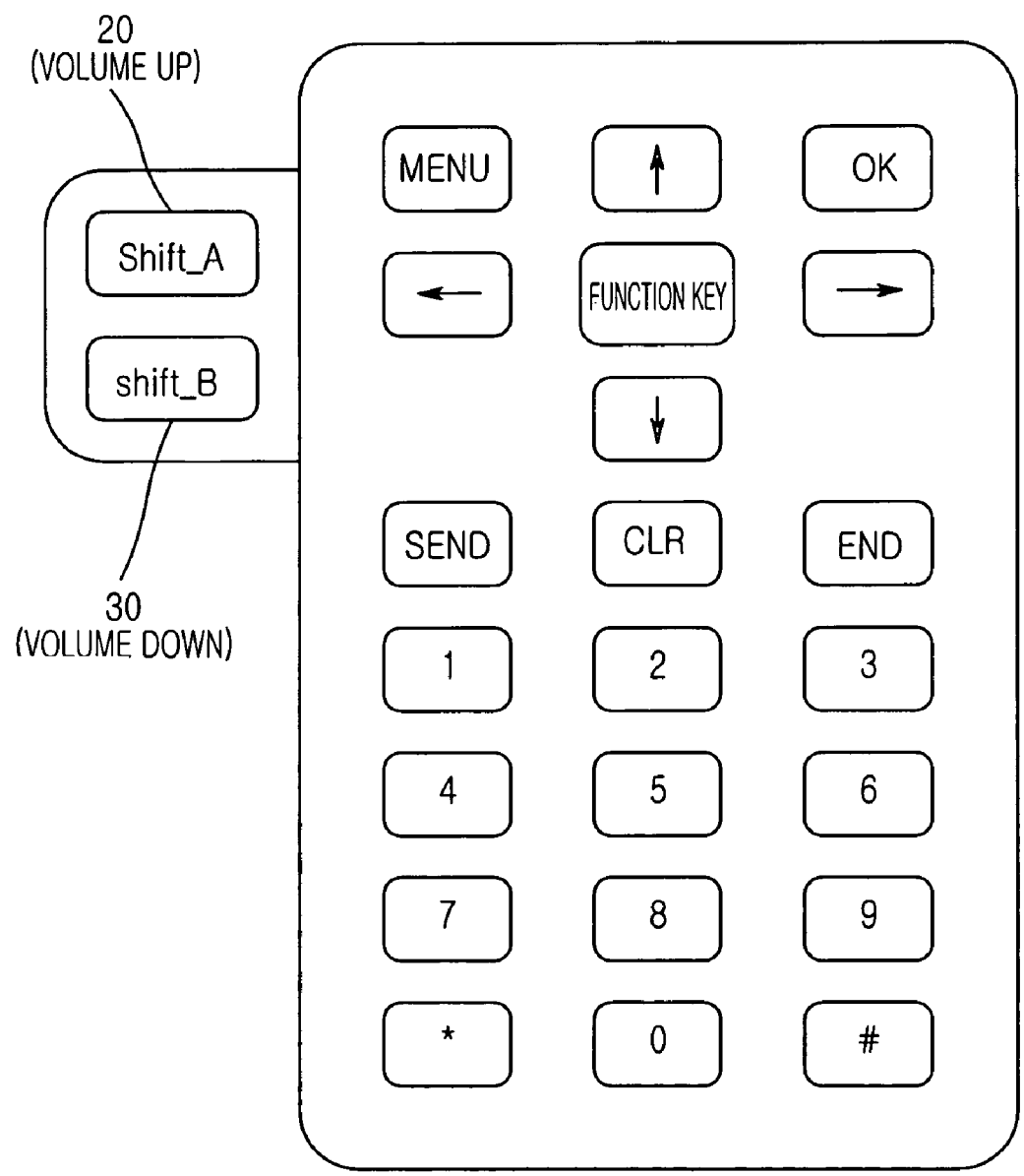
FIG. 1 illustrates a keypad of a mobile terminal according to an embodiment of the present invention.

FIG. 1 illustrates a keypad of a mobile terminal according to an embodiment of the present invention. As shown in FIG. 1, the mobile terminal according to the present invention is provided with a basic key array and temporary mode conversion keys, shift-A key 20 and a shift-B key 30.

For a user's convenience, the user can assign any key that is not used for character input, as a temporary mode conversion key. When there are many assignable keys, they can be used for other functions.

In the present invention, either the shift-A or shift-B key 20 or 30 can be used as the temporary mode conversion key. That is, pushing of the volume-up (shift-A) or volume-down (shift-B) key 20 or 30 attached to a side of the mobile terminal is considered as pushing of the temporary mode conversion key. It should be noted here that while the present invention is shown in FIG. 1 to include two temporary mode conversion keys by way of example, the present invention only requires one temporary mode conversion key and may include multiple temporary mode conversion keys. Further, the assigned temporary mode conversion key can serve another function when not in a character input mode (e.g., a volume control key as illustrated in FIG. 1) or can be include in the mobile terminal for sole purpose of being an assignable temporary mode conversion key.

As described above, when the shift-A or shift-B key 20 or 30 is pushed during the inputting of characters, the mobile terminal detects the pushing as the selection of the temporary mode conversion key, and converts the initial input mode to another input mode so that the user can input characters in the another input mode.

The present invention will be described referring to an example where the character input mode includes three text type input modes, i.e., a Korean character mode, an upper case English character mode, and a lower case English character mode. However, the present invention can also be applied to the case where the character input mode includes other text type character modes, such as other languages and different fonts or symbols.

In accordance with one aspect of the present invention, when a temporary mode conversion key (the shift-A or shift-B key) is held down during inputting of characters in an initial character mode, the input mode is immediately converted to another character mode so that the user can input characters of said another character mode, and the input mode is converted to the character initial input mode by releasing the temporary key. That is, the user can input characters in said another character mode while holding the temporary mode conversion key, and the input mode returns to the initial input mode when the temporary mode conversion key is released.

In accordance with another aspect of the present invention, when the temporary mode conversion key is pushed during inputting of characters in an initial character mode, the input mode is converted to another character mode and the converted input mode remains unchanged after releasing the temporary mode conversion key, and when the temporary mode conversion key is pushed again after inputting of characters in said another input mode, the input mode returns to the initial input mode.

TABLE 1

| Mode Conversion Key | Initial | | |
|---|---|---|---|
| | KR letter | Upper case Eng. | Lower case Eng. |
| Shift-A | Upper case Eng. | KR letter | KR letter |
| Shift-B | Lower case Eng. | Lower case Eng. | Upper case Eng. |

The table 1 illustrates an embodiment according to the present invention wherein the input mode is converted by pushing the temporary mode conversion key during inputting characters in an initial character mode such as a Korean character mode, and upper and lower case English character modes.

When the initial character input mode is the Korean character mode, the input mode is converted to the upper case English input mode by holding the temporary mode conversion key (a shift-A key 20), enabling the user to input upper case English characters by pushing number keys, and, after inputting upper case English characters while holding the shift-A key 20, the input mode returns to the initial mode, i.e., Korean character mode, by releasing the shift-A key 20.

That is, the temporary mode conversion key operates like a shift key of a computer in such a manner that the user can input characters in the converted input mode simultaneously with the holding of the temporary mode conversion key, and the input mode is converted to the initial input mode by releasing the temporary mode conversion key.

In accordance with said another aspect of the present invention, when the temporary mode conversion key (shift-A key) is pushed and released during inputting of characters in the Korean character mode, the input mode is immediately converted to the upper case English character mode to enable the user to input upper case English characters by selecting corresponding number keys, and after the user inputs remaining upper case English characters with the shift-A key released, the input mode returns to the initial input mode (Korean character mode) by pushing the shift-A key again.

As shown in Table 1, when the initial input mode is the Korean character mode, holding the temporary mode conversion key (shift-B key) enables conversion to the lower case English character. When the initial input mode is the upper case English character mode, the input mode is converted to the Korean character mode by holding the temporary mode conversion key (shift-A key), whereby the user can input Korean characters while holding the shift-A key. In addition, when the shift-B key is held during inputting upper case English characters, the input mode is immediately converted to the lower case English character mode, whereby the user can input remaining lower case English characters. Because the same process described above applies to a case where lower case English is set as an initial input mode, this process will not be described again.

Figure 2:
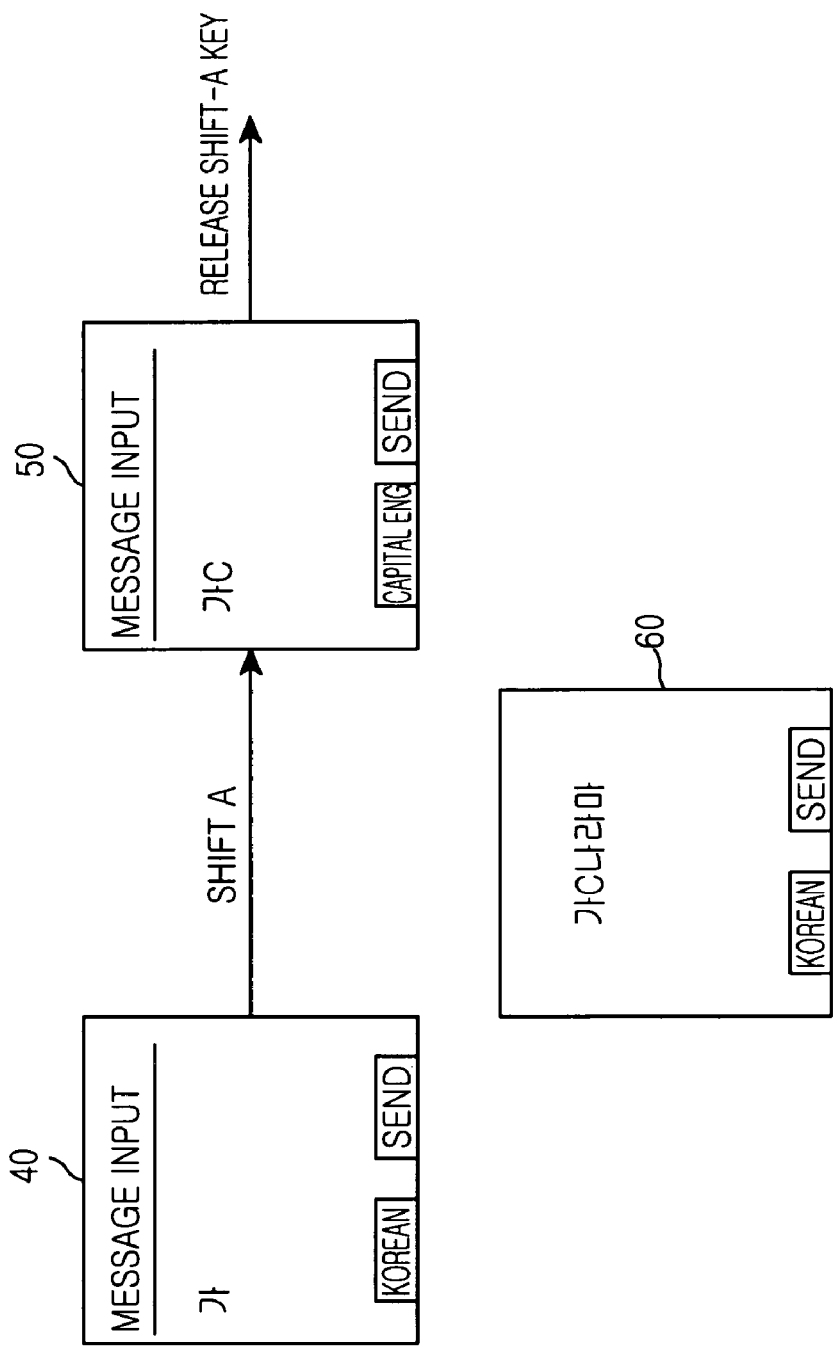
FIG. 2 illustrates inputting characters when a character input mode is converted using a temporary mode conversion key according to the present invention.

FIG. 2 illustrates inputting characters when a character input mode is converted using the temporary mode conversion key. Referring to FIG. 2, after a user selects a menu command for inputting a character message, the user inputs a Korean character "가" (pronounced as "Ka" in English) in the Korean character mode as indicated by reference numeral 40. During inputting the Korean characters, the input mode can be converted to the upper case English character mode by holding the shift-A key, enabling the user to input upper case English characters by pushing corresponding number keys. As indicated by reference numeral 50, the user inputs an upper case English character "C" by pushing a number key "2" while holding the shift-A key 20. Thereafter, the user releases the shift-A key to convert the input mode back to the Korean character mode, and then as indicated by reference numeral 60, the user inputs remaining Korean characters "나라마" (pronounced as "Na Ra Ma" in English).

Figure 3:
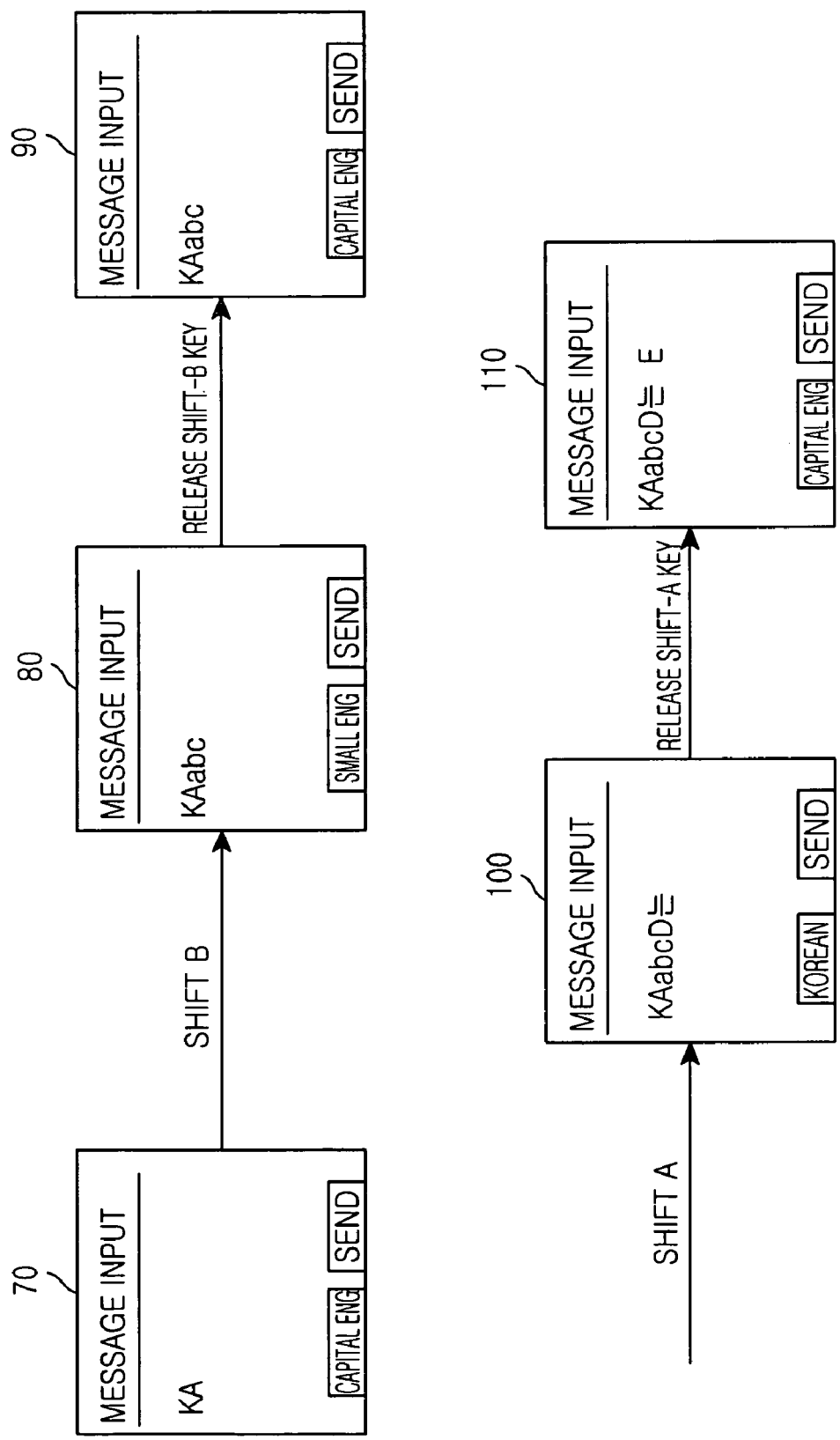
FIG. 3 illustrates another example of inputting characters when the character input mode is converted using the temporary mode conversion key according to the present invention.

FIG. 3 illustrates another example of inputting characters when the character input mode is converted using the temporary mode conversion key. Referring to FIG. 3, after a user selects a menu command for inputting a character message, the user inputs letters "KA" in the upper case English character mode as indicated by reference numeral 70. As indicated by reference numeral 80, after converting the input mode to the lower case English character mode by holding the temporary mode conversion key (shift-B key), the user inputs lower case English characters "abc". Thereafter, the user releases the shift-B key 30 to return the input mode to the upper case English character mode, and then as indicated by reference numeral 90, the user inputs an upper case English character "D". Then, after holding the shift-A key to convert the input mode to the Korean character mode, the user inputs a Korean character "는" as indicated by reference numeral 100. After releasing the shift-A key to return to the initial upper case English character mode, the user inputs "E" as indicated by reference numeral 110.

As described above, in accordance with the present invention, such a character input method may be performed in such a manner that the input mode is converted by pushing the temporary mode conversion key (the shift-A key, the shift-B key, or any other key settable as the conversion key) as illustrated in Table 1, and after inputting characters in the converted character mode while the conversion key is not held down, the input mode returns to the initial character mode by pushing again the conversion key.

Figure 4:
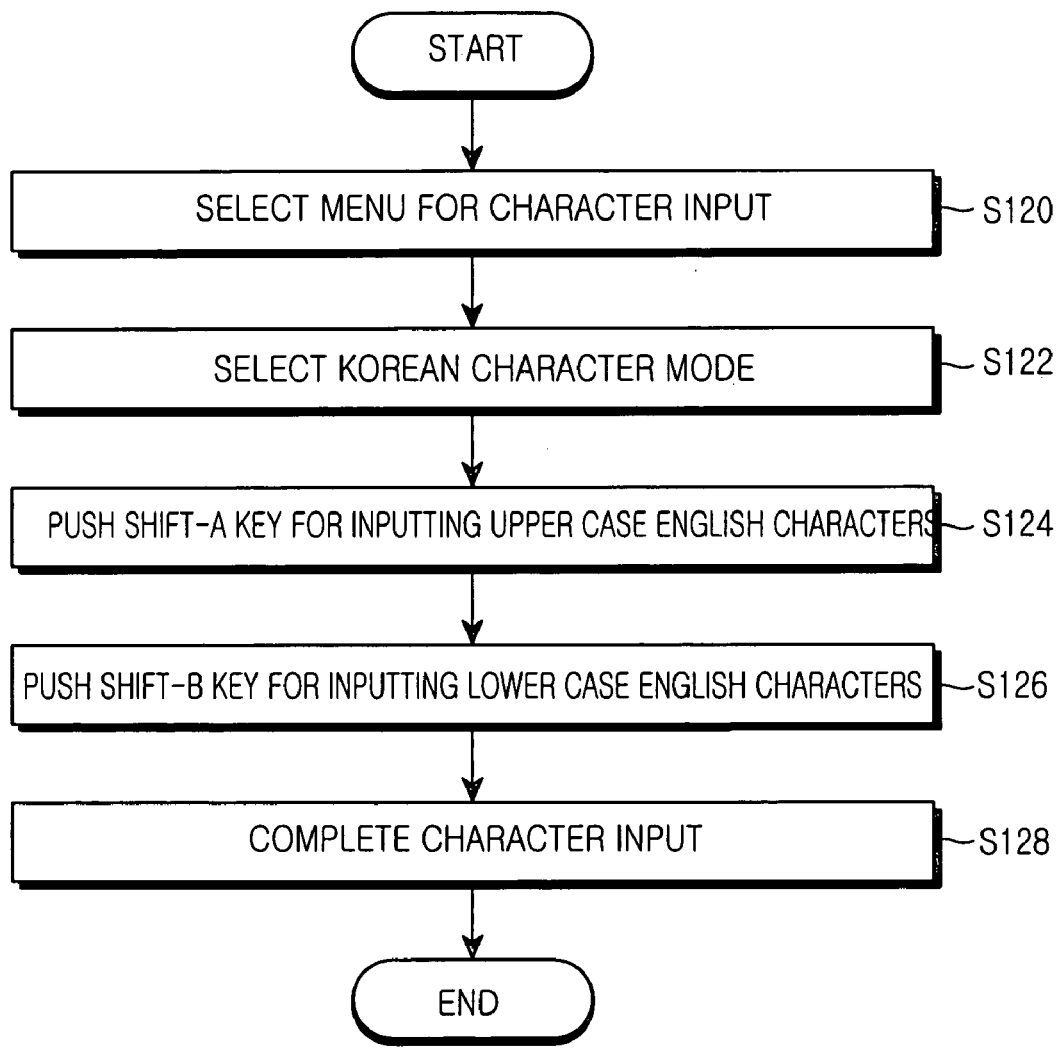
FIG. 4 is a flowchart illustrating a character input method according to the present invention where the character input mode is converted using the temporary mode conversion key.

FIG. 4 is a flowchart illustrating a character input method according to the present invention where the character input mode is converted using the temporary mode conversion key. Referring to FIG. 4, the user selects a menu command for inputting characters in step S120 and selects a Korean character mode as an initial character input mode in step S122. While inputting desired Korean characters, the user holds the shift-A key 20 to convert the character input mode to the upper case English character mode, and then inputs desired upper case English characters in step S124. When the user releases the shift-A key 20 after inputting the upper case English characters, the character input mode is converted to the initial Korean character mode to allow the user to input Korean characters. While inputting the Korean characters, the user holds the shift-B key 30 to convert the input mode to lower case English character mode in step S126, and then inputs lower case English characters, completing the composition of the character message in step S128.

As described above, in accordance with said another aspect of the present invention, such a character input method may be performed in such a manner that the input mode is converted by pushing the temporary mode conversion key (the shift-A key, the shift-B key, or any other key settable as the conversion key) as illustrated in Table 1, and after inputting characters in the converted character mode with the conversion key released, the input mode returns to the initial character mode by pushing the conversion key again.

Figure 5:
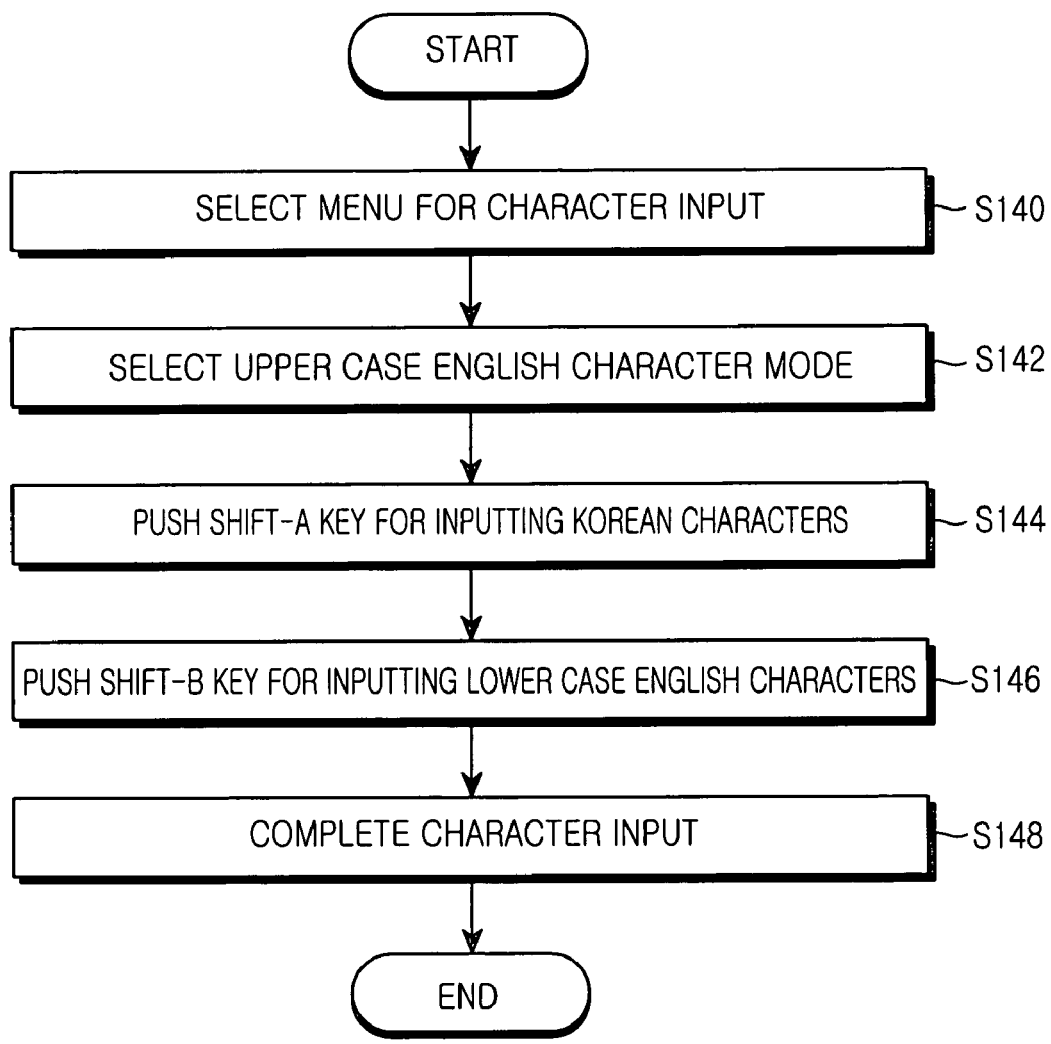
FIG. 5 is a flowchart illustrating another character input method according to the present invention where the character input mode is converted using the temporary mode conversion key.

FIG. 5 is a flowchart illustrating another character input method according to the present invention where the character input mode is converted using the temporary mode conversion key. Referring to FIG. 5, the user selects a menu command for inputting characters in step S140 and selects an upper case English character mode as an initial character input mode in step S142. While inputting desired upper case English characters, the user holds the shift-A key to convert the character input mode to the Korean character mode, and then inputs desired Korean characters in step S144. When the user releases the shift-A key 20 after inputting the Korean characters, the character input mode is converted to the initial input mode, i.e., upper case English character mode, enabling the user to input upper case English characters. While inputting the English characters, the user holds the shift-B key 30 to convert the input mode to lower case English character mode in step S146, and then inputs lower case English characters, completing the composition of the character message in step S148.

As is apparent from the above description, the present invention provides a character input device and method wherein, while composing a character message using a mobile terminal, a user can easily change the character input mode between a Korean character mode, and upper and lower case English character modes by selecting a temporary mode conversion key only once, thereby enabling the user to conveniently input characters, particularly when composing a message of mixed English and Korean characters.

In addition, in accordance with said another aspect of the present invention, such a character input method may be performed in such a manner that the input mode is converted by pushing the temporary mode conversion key (the shift-A key, the shift-B key, or any other key settable as the conversion key) as illustrated in Table 1, and after inputting characters in the converted character mode with the conversion key released, the input mode returns to the initial character mode by pushing the conversion key again. In addition, when there is an available shift key, this shift key may be set as a temporary mode conversion key for use in conversion of the character input mode when composing a text of other various languages such as Chinese, German, Japanese, and French languages.

As described above, the present invention provides a character input method and device which allows a user to conveniently input a character message, and because the character input mode can be immediately converted by pushing the temporary mode conversion key, the user can easily and quickly compose a character message even when the message includes mixed Korean and English characters, significantly reducing the possibility of mistyped messages. That is, the present invention makes it convenient to input a character message and allows saving of time Although the preferred embodiments of the present invention have been disclosed for illustrative purposes, those skilled in the art will appreciate that various modifications, additions, and substitutions are possible, without departing from the scope and spirit of the invention as disclosed in the accompanying claims. Accordingly, the scope of the present invention should not be limited to the description of the embodiment, but defined by the accompanying claims as well as equivalents thereof.

What is claimed is:

1. A character input device for a mobile terminal including a plurality of keys, each key being assigned characters of at least two different character types, wherein the mobile terminal is previously set in a character input mode of one of the at least two different character types, while characters of another of the at least two different character types can be selectively input, said character input device comprising:
   at least one temporary mode conversion key included in the mobile terminal;
   a memory for storing character codes of the at least two different character types assigned to each of the plurality of keys; and
   a controller for selecting one of the previously set character input mode and a temporary character mode, based on an input of the temporary mode conversion key, and reading out and recognizing character codes of the at least two different character types from the memory according to the plurality of keys input and the selected character input mode.

2. The character input device as set forth in claim 1, wherein the controller recognizes input characters as converted characters in the temporary character mode while the temporary mode conversion key is held, and recognizes the input characters as characters in the previously set character input mode when the temporary mode conversion key is released.

3. The character input device as set forth in claim 1, wherein the controller recognizes input characters as converted characters in the temporary character mode when the temporary mode conversion key is pressed, and recognizes the input characters as characters in the previously set character input mode when the temporary mode conversion key is pressed again.

4. The character input device as set forth in claim 1, wherein the previously set character mode can be changed into another character mode to input another character of said at least two character types.

5. A method for inputting characters of a plurality of character types using a mobile terminal, comprising the steps of:
   when a controller recognizes that a temporary mode conversion key is held down while inputting characters, converting a character input mode to a temporary character input mode; and
   when the controller recognizes that the temporary mode conversion key is released, returning the character input mode to a previously set character input mode.

6. A method for inputting characters of a plurality of character types using a mobile terminal, comprising the steps of:
   when a controller recognizes that a temporary mode conversion key is pushed while inputting characters, converting a character input mode to a temporary character input mode; and
   when the controller recognizes that the temporary mode conversion key is pushed again, returning the character input mode to a previously set language character input mode.

7. The character input device as set forth in claim 1, wherein the controller recognizes input characters as converted characters in an upper case English character mode while a first temporary mode conversion key is held, and recognizes input characters as converted characters in a lower case English character mode while a second temporary mode conversion key is held.

* * * * *